United States Patent [19]
Hasegawa et al.

[11] Patent Number: 5,999,365
[45] Date of Patent: Dec. 7, 1999

[54] ELECTROMAGNETIC SHIELDING APPARATUS FOR A MEMORY STORAGE DISK MODULE WHICH PERMITS AIR FLOW FOR COOLING

[75] Inventors: Hiroshi Hasegawa, Higashine; Kazunori Tochiyama, Kawasaki, both of Japan

[73] Assignee: Fujitsu Limited, Kawasaki, Japan

[21] Appl. No.: 07/803,465

[22] Filed: Dec. 6, 1991

[30]  Foreign Application Priority Data

Dec. 11, 1990 [JP] Japan .................................. 2-409699

[51] Int. Cl.⁶ ............................ G11B 33/14; G11B 33/12
[52] U.S. Cl. ...................... 360/97.02; 361/687; 361/685; 361/818
[58] Field of Search ............................ 360/97.01, 97.02, 360/97.03, 98.01, 137; 369/75.1, 80; 361/379, 381, 383, 384, 390, 392, 393, 394, 395, 382, 687, 688, 690, 692, 693, 685, 818

[56]  References Cited

U.S. PATENT DOCUMENTS

| | | | |
|---|---|---|---|
| 4,642,715 | 2/1987 | Ende | 360/97.02 |
| 4,702,154 | 10/1987 | Dodson | 361/384 |
| 4,748,540 | 5/1988 | Henneberg et al. | 361/383 |
| 4,754,397 | 6/1988 | Varaiya et al. | 364/200 |
| 4,860,163 | 8/1989 | Sarath | 361/384 |
| 4,899,237 | 2/1990 | Tochiyama et al. | 360/98.02 |
| 4,901,200 | 2/1990 | Mazura | 361/379 |
| 4,926,291 | 5/1990 | Sarraf | 361/384 |
| 5,041,931 | 8/1991 | Uno et al. | 360/97.03 |
| 5,086,422 | 2/1992 | Hagiya et al. | 360/97.02 |
| 5,112,119 | 5/1992 | Cooke et al. | 361/394 |
| 5,121,291 | 6/1992 | Cope et al. | 361/383 |
| 5,136,465 | 8/1992 | Benck et al. | 361/384 |
| 5,173,819 | 12/1992 | Takahashi et al. | 360/97.03 |
| 5,297,116 | 3/1994 | Ikuma | 369/75.1 |
| 5,301,178 | 4/1994 | Okabe et al. | 360/97.02 |
| 5,335,217 | 8/1994 | Kaneda et al. | 369/75.1 |

FOREIGN PATENT DOCUMENTS

| | | |
|---|---|---|
| 62-129198 | 8/1987 | Japan . |
| 62-239394 | 10/1987 | Japan . |
| 63-195697 | 12/1988 | Japan . |

*Primary Examiner*—Craig A. Renner
*Attorney, Agent, or Firm*—Greer, Burns & Crain, Ltd.

[57]  ABSTRACT

A memory storage disk module comprising a memory storage disk unit including at least one memory storage disk, and at least one head able to access the disk for writing and reading data to and from the disk, and a control circuit board. A cover is provided to cover the memory storage disk unit and the control circuit board, and the cover constitutes a shield against an emission of electromagnetic waves, as well as a duct for a flow of cooling air. The cover is composed of a substantially solid main panel portion and front and rear panel portions having small apertures, respectively, allowing air to flow therethrough. A memory storage disk system comprises a plurality of memory storage disk modules, and a rack having the memory storage disk modules therein releasably mounted and being substantially unaffected by electromagnetic waves.

22 Claims, 11 Drawing Sheets

ELECTROMAGNETIC SHIELDING APPARATUS FOR A MEMORY STORAGE DISK MODULE WHICH PERMITS AIR FLOW FOR COOLING

BACKGROUND OF THE INVENTION

1. Field of the Invention

The present invention relates to a memory storage disk module adapted for use, for example, in a computer memory unit, and including at least one memory storage disk and at least one head able to access the storage disk.

2. Description of the Related Art

Memory storage disk systems, including memory storage disks such as magnetic disks or optical disks, are widely used as external memories of computers. In such a system, a plurality of magnetic disks and cooperating magnetic heads are hermetically housed in a housing, to thus constitute a memory storage disk unit as is well known and disclosed, for example, in U.S. Pat. No. 4,899,237. The magnetic heads are carried by movable arms or the like and are capable of a selective access to a desired magnetic disk. Usually, a control circuit board is attached to the memory storage disk unit, and the memory storage disk unit and the control circuit board constitute a memory storage disk module.

A memory storage disk system of the large computer system comprises a plurality of such memory storage disk modules accommodated in a rack or a cabinet, as disclosed, for example, in U.S. Pat. No. 4,754,397. This patent also discloses power supply units arranged in the cabinet at a lower position thereof. Each module is carried by a drawer slidably accommodated in each shelf of a cabinet.

Japanese Unexamined Patent Publication (Kokai) No. 62-239394 also discloses a memory storage disk system comprising a plurality of memory storage disk modules and power supply units accommodated in a rack or a cabinet. In this publication, each memory storage disk and a cooling fan are housed in a duct-like drawer slidably accommodated in the rack or cabinet. As a cooling fan is provided in the duct-like drawer of each module, the cooling capability for each module can be greatly improved in this memory storage disk system.

Many countries have standards requiring a reduction of electromagnetic noise radiated externally from an electric or electronic device, and to satisfy these standards, manufacturers of memory storage disk systems often provide shields for preventing an emission of electromagnetic waves from the memory storage disk module and associated control circuit board in the rack or cabinet of the electric or electronic device, externally of the rack or cabinet. Therefore, the rack or cabinet for these systems must be made extra large, and thus costly, and accordingly, attempts are being made to produce a rack or cabinet in a smaller and more simple form, to thereby reduce the cost of manufacturing same. Accordingly, there is a need for a rack or cabinet that can be made easily and cheaply, even if each memory storage disk module is shielded against radiation thereby of electromagnetic waves.

Also, manufacturers of such systems wish to facilitate the assembly work of the memory storage disk system, and accordingly, there is a need for a memory storage disk module having features that will allow manufacturers of these systems to make the rack or cabinet in a more simple manner.

SUMMARY OF THE INVENTION

The object of the present invention to provide a memory storage disk module having a good cooling capacity.

Another object of the present invention to provide a memory storage disk module having a shield against radiation of electromagnetic waves therefrom sufficient to reduce noise radiated externally from an electric or electronic device to which the memory storage disk module is to be mounted.

The object of the present invention to provide a memory storage disk module having a good cooling capacity and a shield against radiation of electromagnetic waves therefrom sufficient to reduce noise radiated externally from an electric or electronic device to which the memory storage disk module is to be mounted.

Another object of the present invention is to provide a memory storage disk module having a good cooling capacity and shielded against an emission thereby of electromagnetic waves, and allowing an electric or electronic device to which the memory storage disk module is to be mounted to have a simple design.

Still another object of the present invention is to provide a memory storage disk module having a good cooling capacity and shielded against an emission thereby of electromagnetic waves, and including a power supply means incorporated therein to thereby allow simple design and easy assembly of an electric or electronic device to which the memory storage disk module is to be mounted.

A further object of the present invention is to provide a memory storage disk module having a good cooling capacity and shielded against an emission thereby of electromagnetic waves and including a plug-in connector means incorporated therein, to thereby allow simple design and easy assembly of an electric or electronic device to which the memory storage disk module is to be mounted.

According to the present invention, there is provided a memory storage disk module comprising a memory storage disk unit including at least one memory storage disk, and at least one head able to access the disk for writing and reading data to and from disk, a control circuit board attached to the memory storage disk unit and including a control circuit for controlling the disk and the head, and cover means covering at least the memory storage disk unit and the control circuit board for shielding an emission of electromagnetic waves from at least the control circuit board, the cover means having a longitudinal axis, a main panel portion extending generally along and around the longitudinal axis and having opposite ends, a front panel located on the main panel portion at one end thereof, and a rear panel portion located on the main panel portion at the other end thereof, the main panel portion being substantially solid and the front and rear panel portions having small apertures, respectively, allowing air to flow therethrough.

According to the present invention, the cover means is made from a metal able to provide a shield against an emission of electromagnetic waves. The main panel portion of the cover means extends along the longitudinal axis and around the longitudinal axis, to thereby constitute a duct-like cover allowing a flow of cooling air over the memory storage disk unit and the control circuit board. The main panel portion is solid, i.e., there are no significant openings in the wall of the main panel portion constituting the shield. The front and rear panel portions have small apertures, respectively, allowing air to flow therethrough, but these small apertures must have a size and be arranged such that the front and rear panel portions also provide a shielding effect, respectively, to satisfy the relevant regulations imposed in many countries.

A memory storage disk system comprises a plurality of such memory storage disk modules, and a rack in which the memory storage disk modules is releasably mounted and is substantially free of electromagnetic waves; this is very advantageous to a final product manufacturer, in the designing and assembling of a memory storage system.

In another aspect to the present invention, a memory storage disk module comprises a memory storage disk unit including at least one memory storage disk, and at least one head able to access the disk for writing and reading data to and from the disk, a control circuit board attached to the memory storage disk unit and including a control circuit for controlling the disk and the head, cover means covering at least the memory storage disk unit and the control circuit board, a tray for fixedly carrying the memory storage disk unit and the control circuit board, and the cover means being attached to the tray, and at least one cooling fan arranged within the cover means for supplying a flow of air through the cover means.

In still another aspect of the present invention, a memory storage disk module comprises a memory storage disk unit including at least one memory storage disk, and at least one head able to access the disk for writing and reading data to and from the disk, a control circuit board attached to the memory storage disk unit and including a control circuit for controlling the disk and the head, a power supply unit electrically connectable to at least one of the memory storage disk unit and the control circuit board, cover means covering at least the memory storage disk unit, the control circuit board, and the power supply unit, for shielding an emission of electromagnetic waves from at least the control circuit board, the cover means having a longitudinal axis, a main panel portion extending generally along and around the longitudinal axis and having opposite ends, a front panel portion located on the main panel portion at one end thereof, and a rear panel portion located on the main panel portion at the other end thereof, the main panel portion being substantially solid and the front and rear panel portions having small apertures, respectively, allowing air to flow therethrough, and first and second cooling fans arranged within the cover means for supplying a flow of air through the cover means, the first fan being attached to the memory storage disk unit and the second fan being attached to the power unit.

In still another aspect of the present invention, a memory storage disk module comprises a memory storage disk unit including at least one memory storage disk, and at least one head able to access the disk for writing and reading data to and from the disk, a control circuit board attached to the memory storage disk unit and including a control circuit for controlling the disk and the head, a power supply unit electrically connectable to at least one of the memory storage disk unit and the control circuit board, cover means covering at least the memory storage disk unit, the control circuit board, and the power supply unit, a tray for fixedly carrying the memory storage disk unit, the control circuit board, and the power supply means, the cover means being attached to the tray, and at least one fan arranged within the cover means for supplying a flow of air through the cover means.

Also, in yet another aspect of the present invention, a memory storage disk module comprises a memory storage disk unit including at least one memory storage disk, and at least one head able to access the disk for writing and reading data to and from the disk, a control circuit board attached to the memory storage disk unit and including a control circuit for controlling the disk and the head, cover means covering at least the memory storage disk unit and the control circuit board for shielding an emission of electromagnetic waves from at least the control circuit board, the cover means having a longitudinal axis, a main panel portion extending generally along and around the longitudinal axis and having opposite ends, a front panel portion located on the main panel portion at one end thereof, and a rear panel portion located on the main panel portion at the other end thereof, the main panel portion being substantially solid and the front and rear panel portions having small apertures, respectively, allowing air to flow therethrough, and connector means arranged on or near the rear panel portion and electrically connectable to at least one of the memory storage disk unit and the control circuit board, the connector means being exposed from the rear panel portion and having a plug-in means able to be coupled with an external unit.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 1:
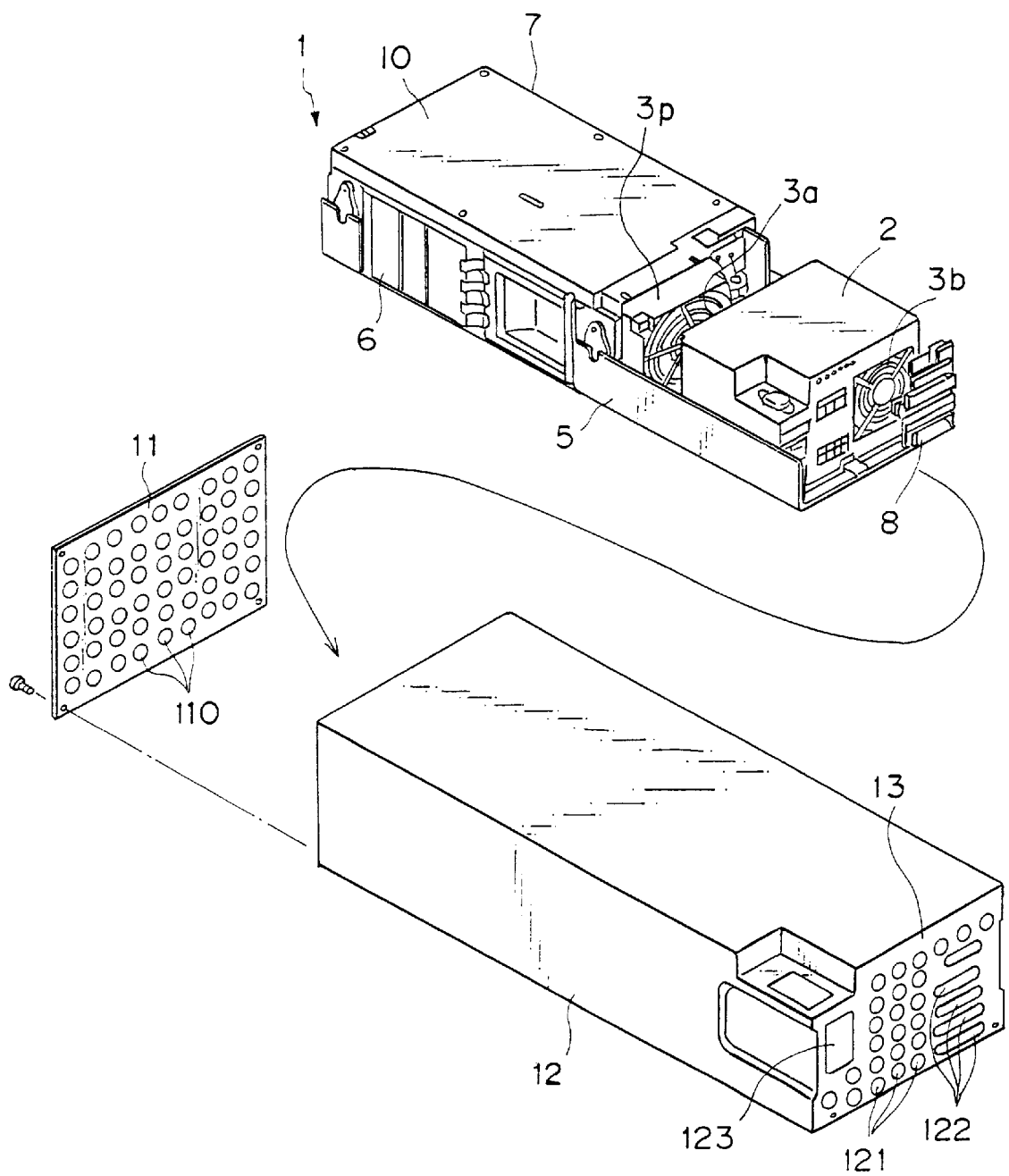
FIG. 1 is an exploded perspective view of a memory storage disk module according to the embodiment of the present invention.
Figure 2:
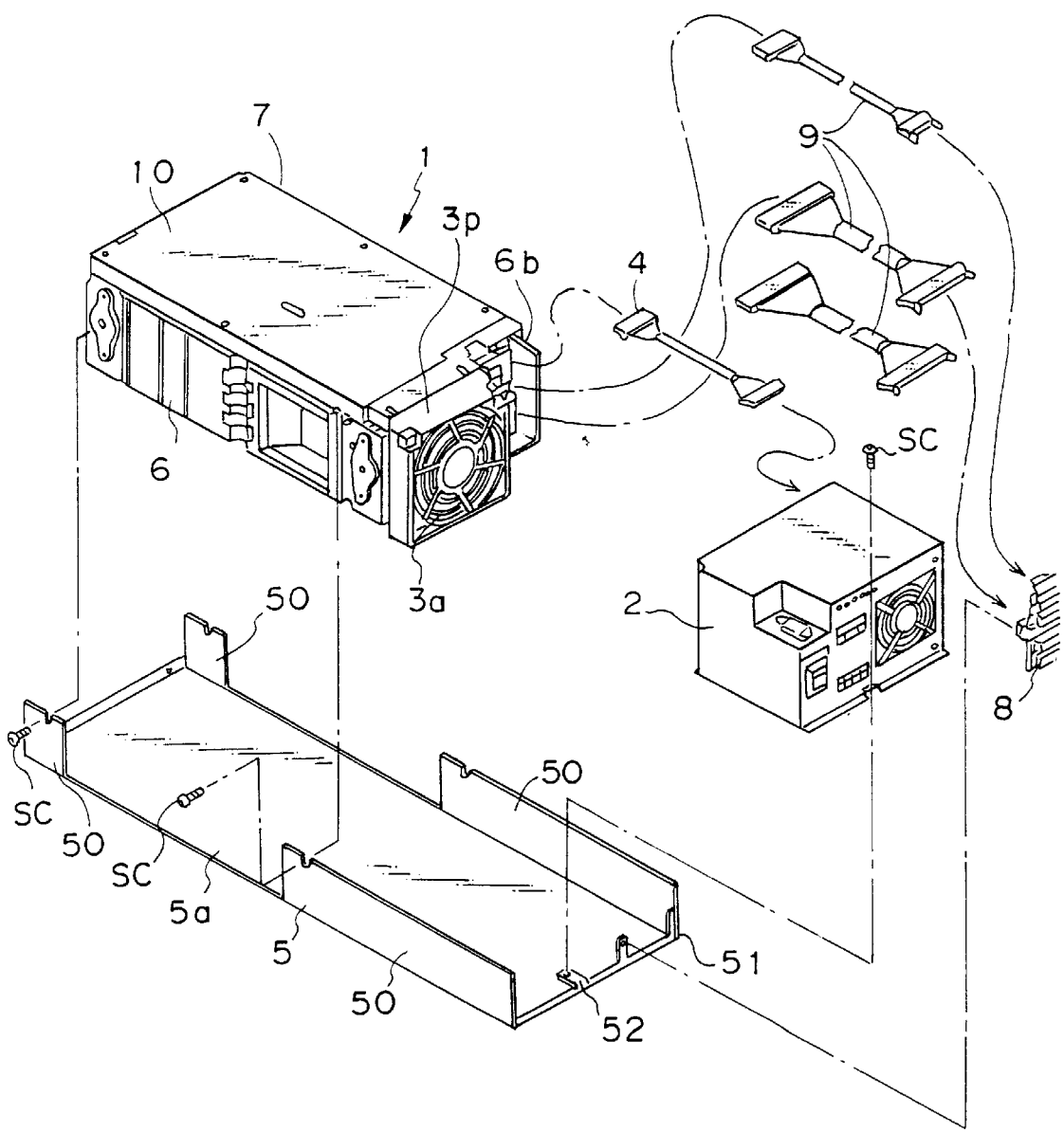
FIG. 2 is an exploded perspective view of the inner tray assembly of FIG. 1.
Figure 3:
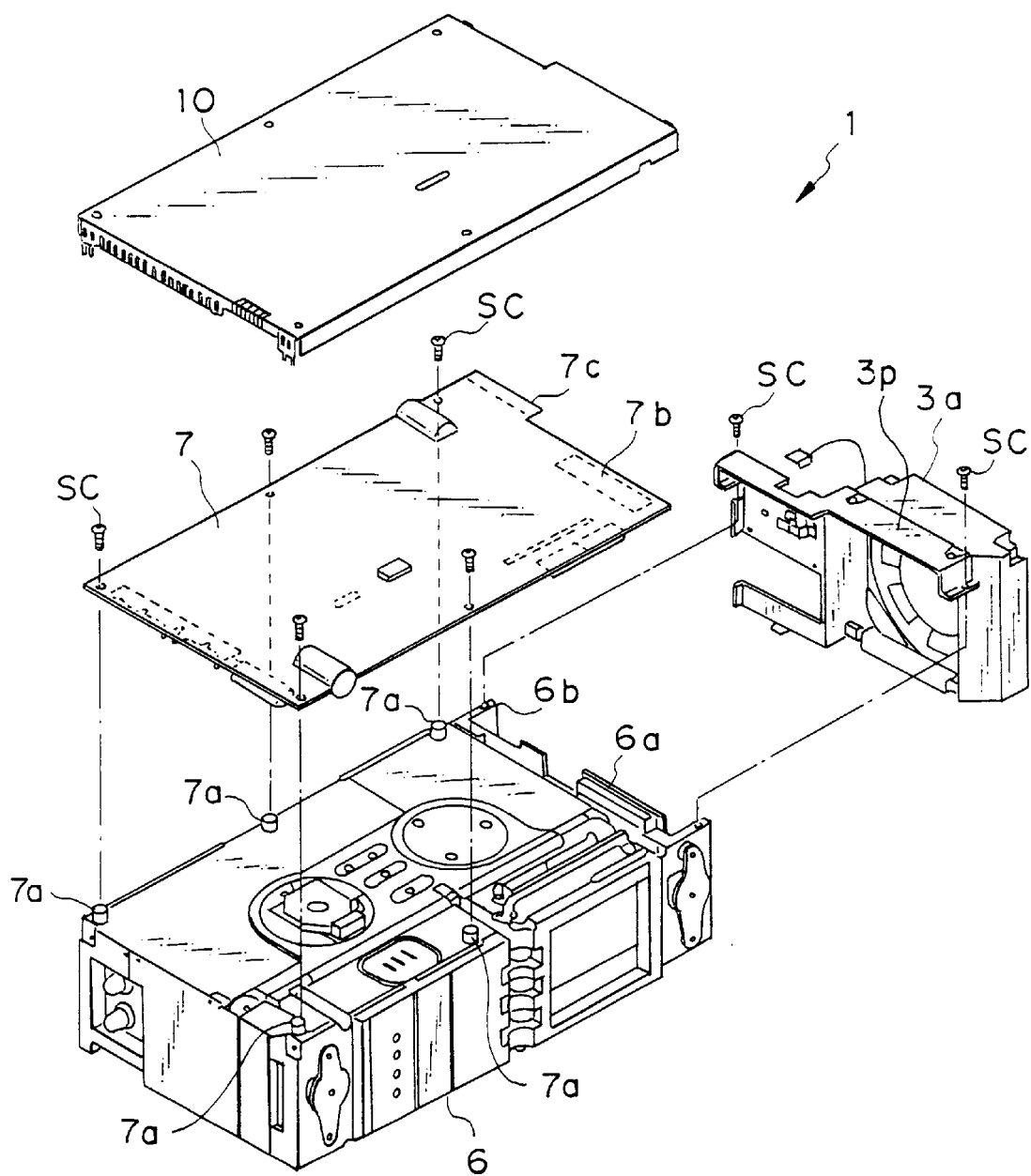
FIG. 3 is an exploded perspective view of the memory storage disk unit, the control circuit board, and the fan of FIG. 1.

FIGS. 1 to 10 show a memory storage disk module 1 according to the embodiment of the present invention. Referring particularly to FIGS. 1 to 3, the memory storage disk module 1 includes a memory storage disk unit 6, a control circuit board 7, and cover means 5, 11, and 12. The cover means comprises an inner tray 5, a front cover 11, and a duct-like main cover 12. The duct-like main cover 12 has an inverted U-shape and is composed of three lateral side panels extending along and around a central longitudinal axis of the duct-like main cover 12. A rear panel 13 is formed integrally with the main cover 12. In the following description below, the left side in the drawings is referred to as the front side and the right side in the drawing is referred to as the rear side.

The memory storage disk module 1 of the preferred embodiment also includes a power supply unit 2 and a connector unit 8.

The memory storage disk unit 6 comprises a plurality of magnetic disks and cooperating magnetic heads, as is well known. The magnetic disks and the heads are hermetically housed in a housing. This housing of the memory storage disk unit 6 shown in the drawings is described in more detail in U.S. Pat. No. 4,899,237.

As shown in FIG. 3, interface connector boards 6a and 6b having printed circuits are attached to the housing of the memory storage disk unit 6, and are electrically connected to electric components of the memory storage disk unit 6. A control board 7 comprises a main control circuit for the magnetic disks and the magnetic heads, and is attached to the housing of the memory storage disk 6 by five projections 7a at the top surface of the housing. The control circuit board 7 is fastened to these projections 7a by screws SC, in such a manner that a gap exists between the control circuit board 7 and the housing of the memory storage disk unit 6, and a top protection panel 10 is fitted over the control circuit board 7. The control circuit board 7 has a connector 7b coupled to the interface connector board 6a and is electrically connected to the electric components in the memory storage disk unit 6 via the interface connector board 6a. Another interface connector board 6b serves as a power supply connector electrically connected to the memory storage disk unit 6 and the control circuit board 7 at a position 7c. A cooling fan 3a is attached by screws SC to the rear side of the memory storage disk unit 6. As shown in FIGS. 1 to 3, the cooling fan 3a includes a top cover 3p which can be arranged in alignment with the top protection panel 10. Accordingly, air can flow through the gap between the control circuit board 7 and the memory storage disk unit 6, and is guided by the top cover 3p into the cooling fan 3a.

Figure 4:
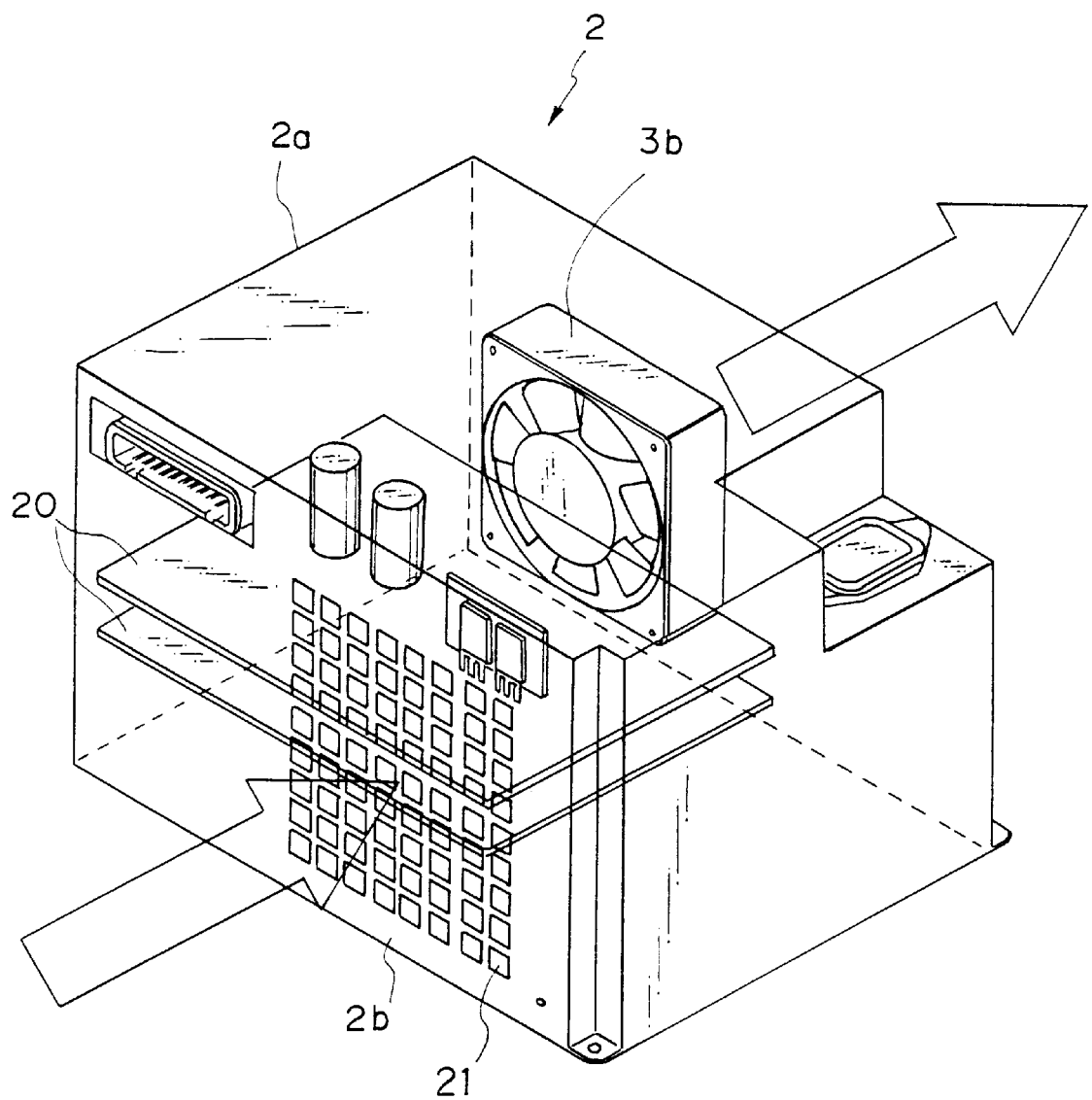
FIG. 4 is a perspective view of the power supply unit of FIG. 1.

As shown in FIGS. 1 and 2, the power supply unit 2 is arranged at the rear side of the cooling fan 3a of the memory storage disk unit 6. As shown in FIG. 4, the power supply unit 2 comprises a frame 2a, and power supply printed boards 20 arranged in the frame 2a. The frame 2a includes a front panel 2b having a plurality of apertures 21, and a cooling fan 3b is attached to the rear side of the frame 2a to supply a flow of cooling air through the power supply unit 2, as shown by the arrow.

Figure 5:
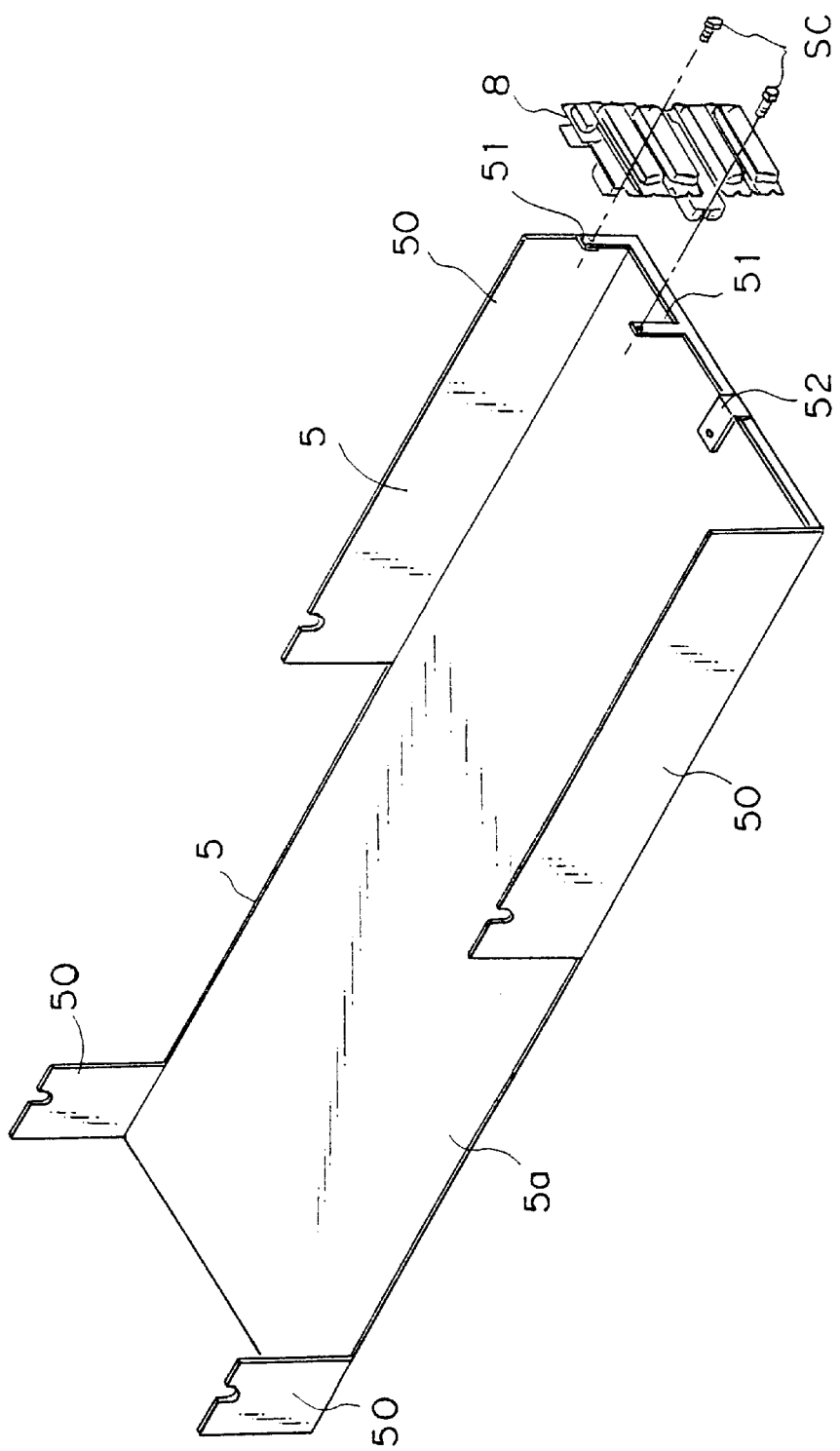
FIG. 5 is an exploded perspective view of the inner tray and the connector of FIG. 1.

As shown in FIGS. 2 and 5, the inner tray 5 of the cover means comprises an elongated flat base panel 5a, front and rear side panels 50 extending upwardly from the base panel 5a, to fixedly carry the memory storage disk unit 6, connector mounting end panels 51 extending upwardly from the base panel 5a, for mounting the connector unit 8 thereon, and a power supply unit fixing tab 52 at the rear end thereof, for fixing the power supply unit 2 thereto. An inner tray assembly is formed by fixing the memory storage disk unit 6 with the control circuit board 7 to the front and rear side panels 50 of the inner tray 5, by screws SC, then fixing the power supply unit 2 to the fixing tab 52 by another screw SC, and then fixing the connector unit 8 to the end panels 51 of the inner tray 5 by other screws SC.

Figure 6:
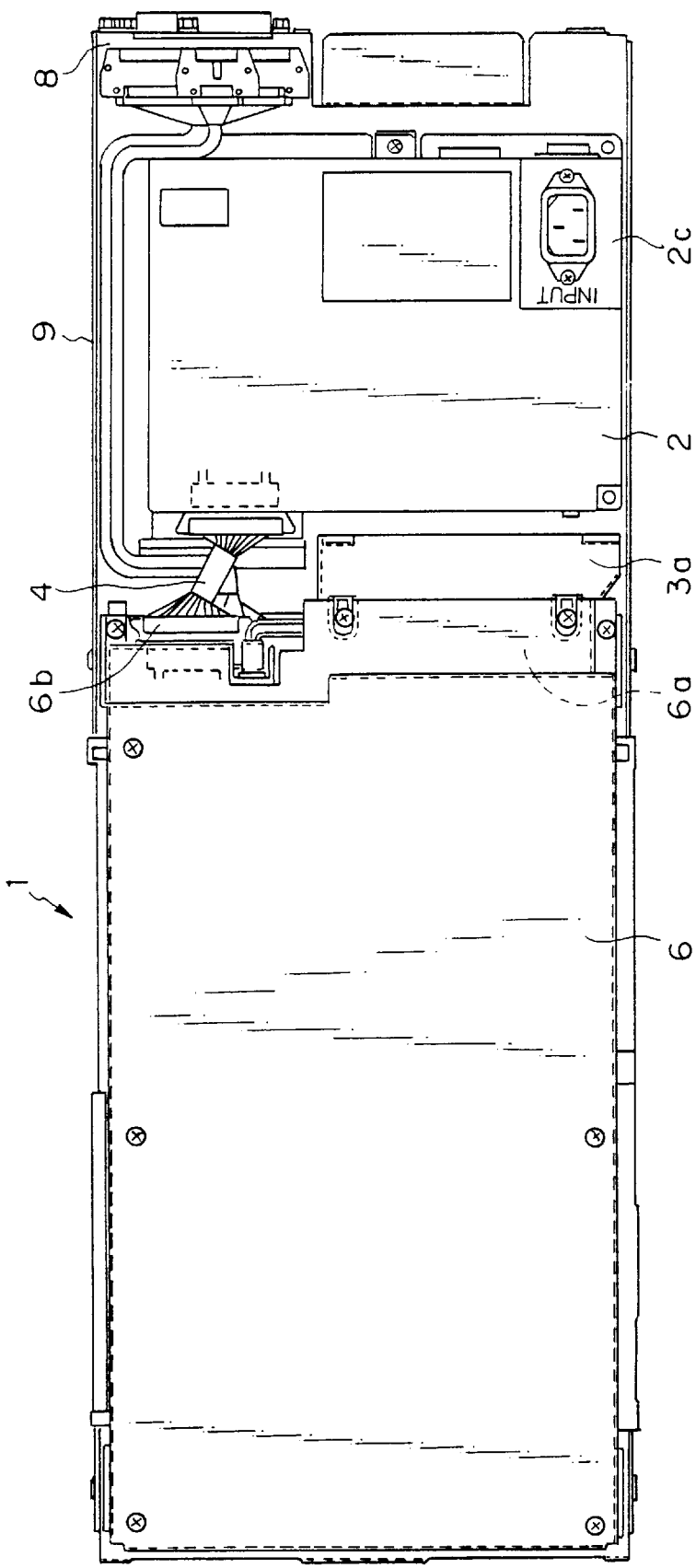
FIG. 6 is a plan view of the inner tray assembly of FIG. 1.
Figure 9:
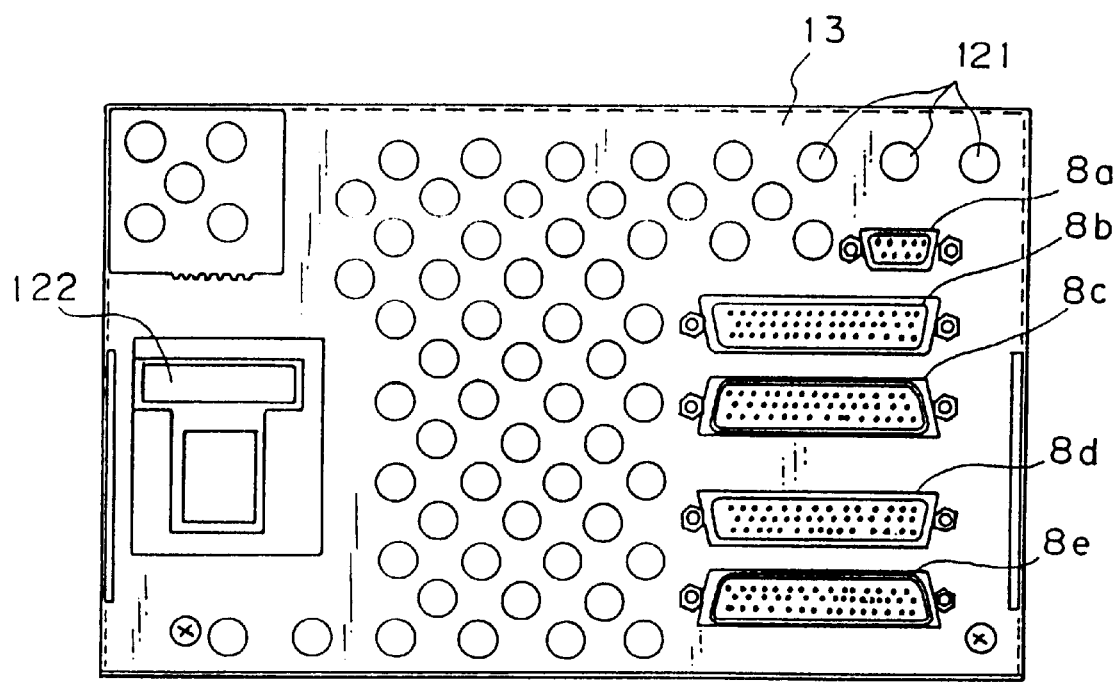
FIG. 9 is a rear end view of the assembled memory storage module of FIG. 1.
Figure 10:
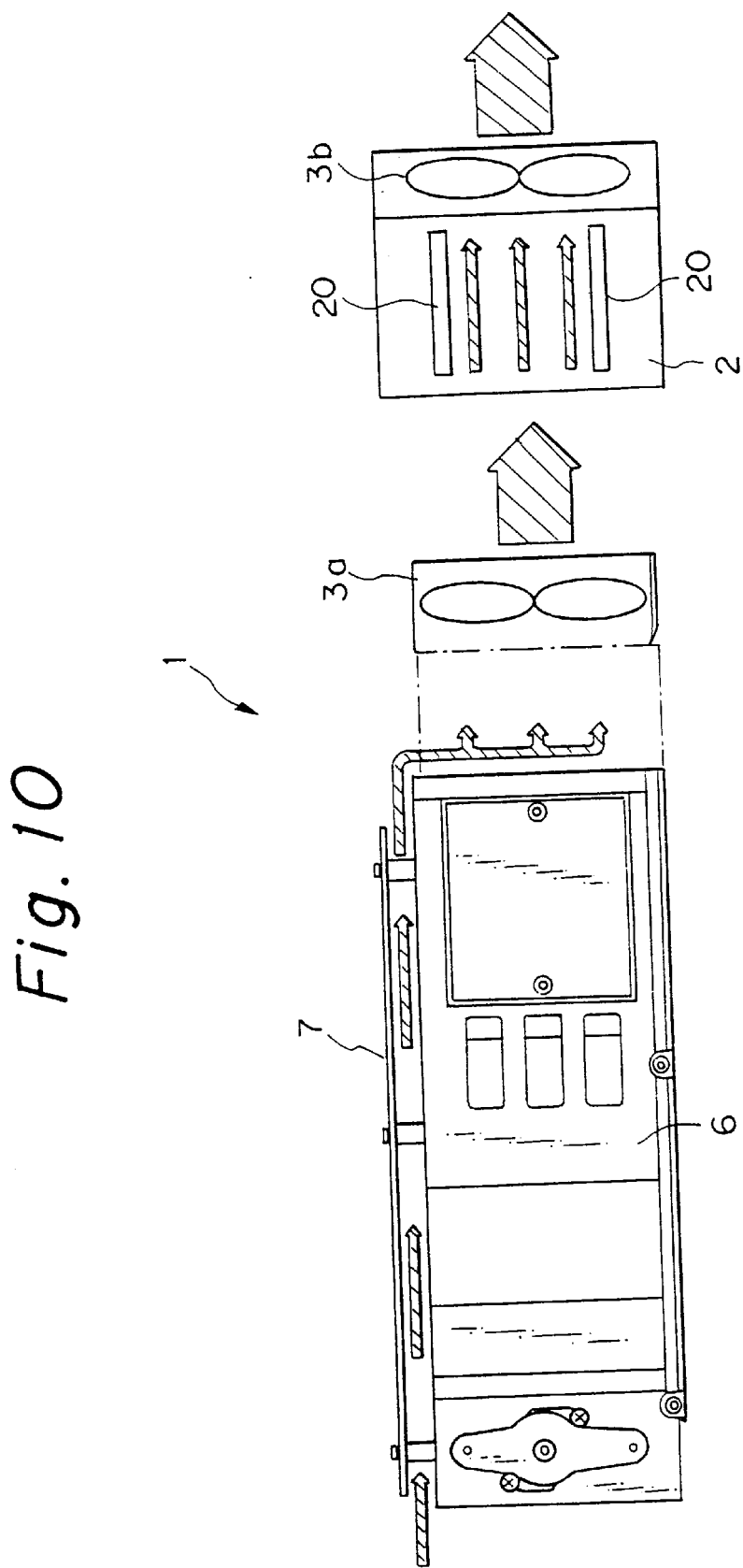
FIG. 10 is a side cross-sectional view of the memory storage disk module of FIG. 1, showing the air flow in the module.

As shown in FIGS. 2 and 6, a power supply cable 4 connects the interface connector board 6b of the memory storage disk unit 6 to the power supply unit 2 having an input socket 2c, as shown in FIG. 6, and interface cables 9 connect the interface connector board 6a of the memory storage disk unit 6 to the connector unit 8. The interface cables 9 extend along side the power supply unit 2. Accordingly, the inner tray assembly is completed, wherein the memory storage disk unit 6 is arranged on the front portion of the inner tray 5 and the power supply on the rear portion of the inner tray 5, with the connector unit 8 projecting rearward from the inner tray 5. As shown in FIG. 9, the connector unit 8 comprises coupling elements 8a to 8e, adapted to be coupled to external units by a plug-in connection. For example, the coupling elements 8a, 8b and 8d are provided with sockets able to receive therein pins of plugs of the external units, and the coupling elements 8c and 8e also are provided with pins able to be fitted in sockets of the external units.

As shown in FIGS. 1 and 7 to 9, the front cover 11 has a plurality of small apertures 110 and the rear panel 13 has a plurality of small apertures 121. The rear panel 13 also has opening 122 in register with the connector unit 8, to expose the connector unit 8 from the duct-like main cover 12 when fitted thereto. The rear panel 13 also has an opening 123 allowing access to a switch of the power unit 2. The duct-like main cover 12 is substantially rigid, i.e., has no openings.

Figure 7:
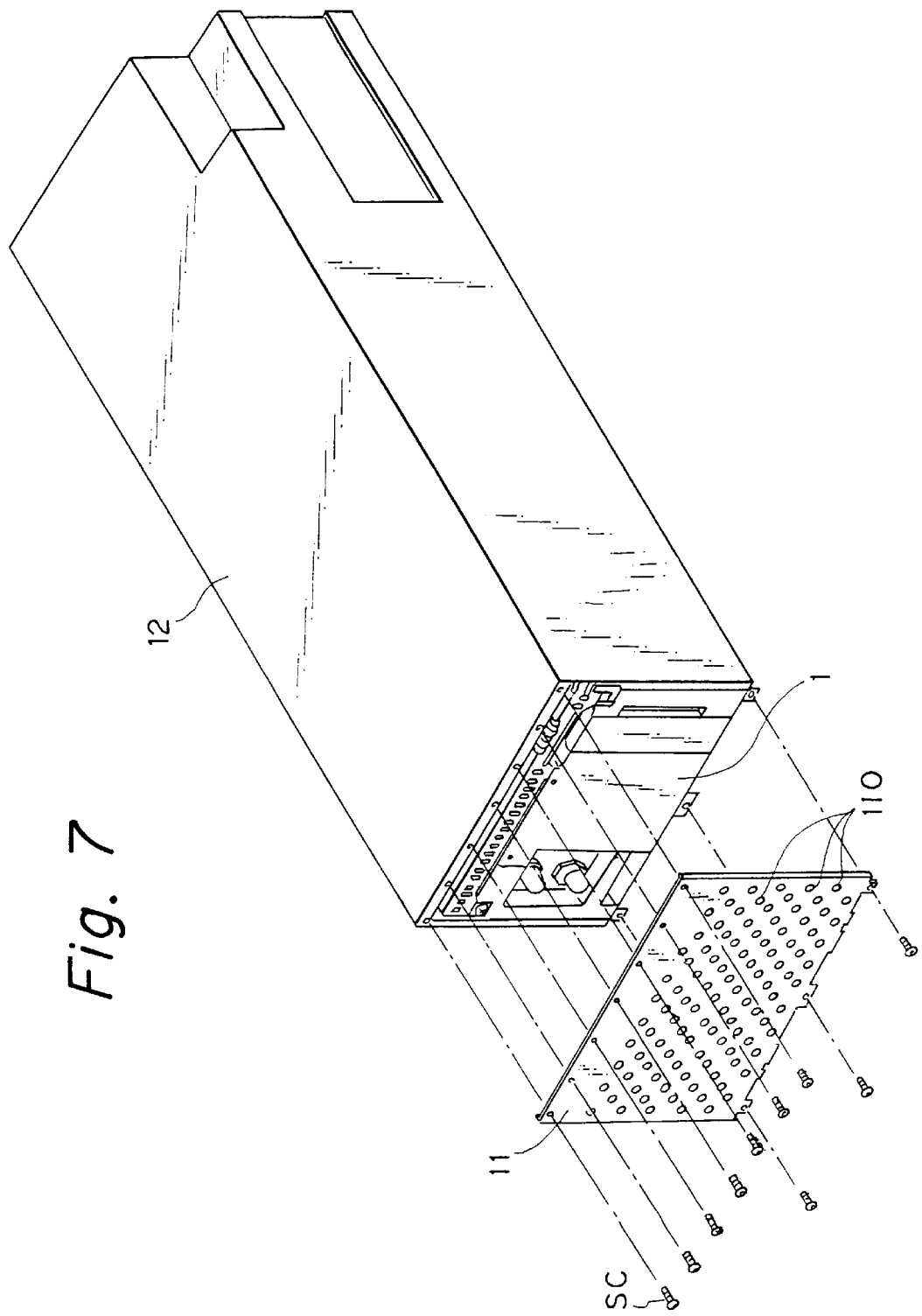
FIG. 7 is an exploded perspective view of the memory storage disk module of FIG. 1, showing the front cover attached to the duct cover.
Figure 8:
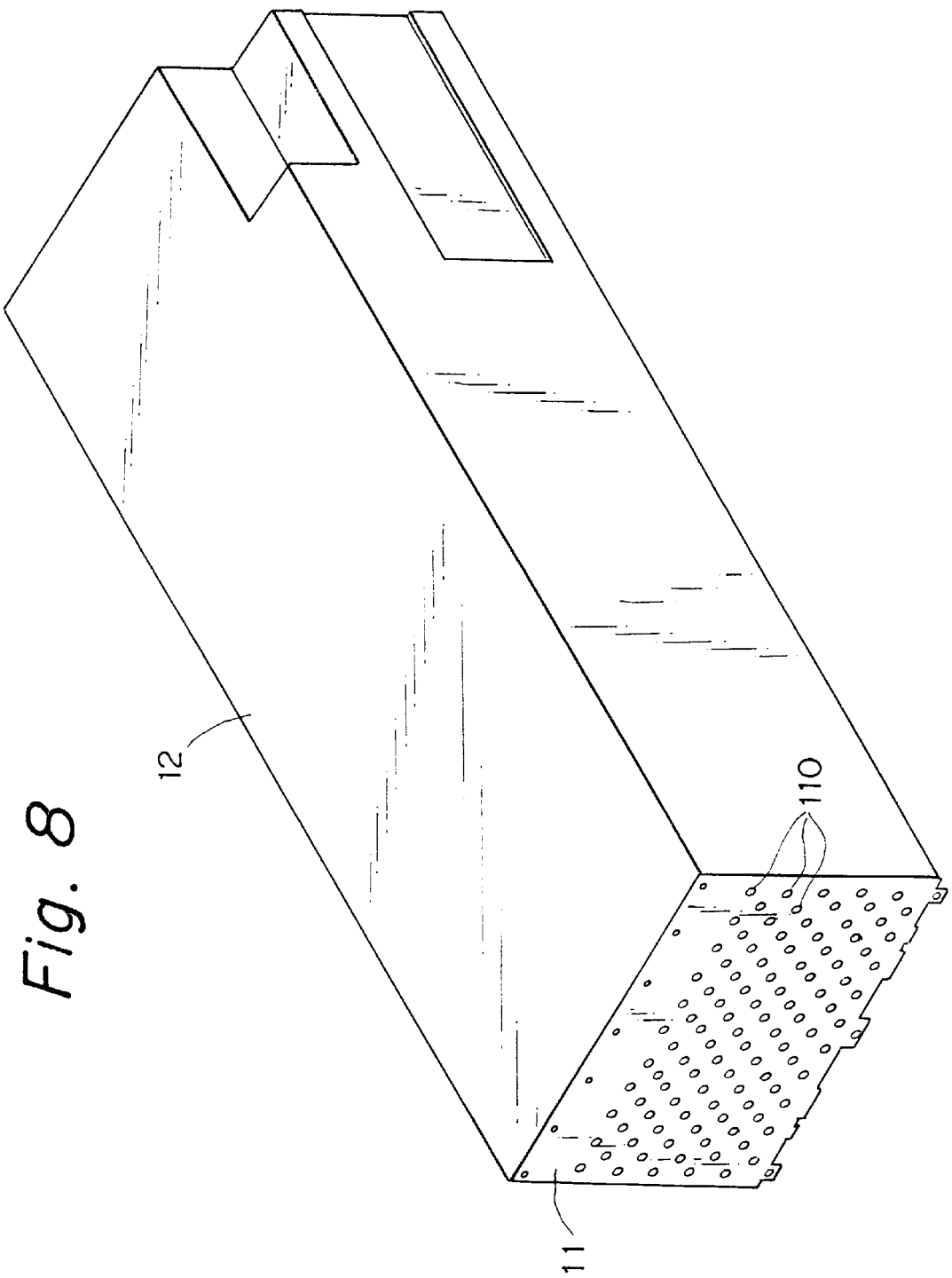
FIG. 8 is an exploded perspective view of the assembled memory storage disk module of FIG. 1.

When completing the memory storage disk module 1, the duct-like main cover 12 is slidably fitted over the inner tray assembly, with the front of the duct-like main cover 12 being first engaged with the rear of the inner tray assembly, as shown in FIG. 1. Then the front cover 11 is attached and fixed to the assembly by the screws SC, as shown in FIG. 7.

The cover means comprising the front cover 11 and the duct-like main cover 12 with the rear panel 13 (and the inner tray) is made from a metal, such as stainless steel, and thus the cover means constitutes a shield against an emission of electromagnetic waves. The duct-like main cover 12 is substantially rigid, and the apertures 110 of the front cover and the apertures 121 of the rear panel 13 are small enough to prevent an emission of the electromagnetic waves from the cover means, but will allow air to flow through the cover means. As shown by the arrows in FIG. 10, the cooling fans 3a and 3b supply a flow of cooling air through a gap between the memory storage disk unit 6 and associated control circuit board 7, and through gaps between the power supply circuit boards 20 of the power supply unit 2.

The cover means according to the present invention can satisfy any standards requiring a reduction of electromagnetic noise emitted externally from an electric or electronic device. For example, the following table is an example of recent standards promulgated by the Voluntary Control Council For Interference Data Processing Equipment and Electronic Office Machines (VCCI), Federal Communication Commission (FCC), Verband Deutchen Electrotechniker (VDE), and International Special Committee on Radio Interference (CISPR).

| | CLASS | FREQUENCY (MHz) | dB at 3 m | 10 m | 30 m |
|---|---|---|---|---|---|
| VCCI | 1 | 30–230 | 50 | 40 | 30 |
| | | 230–1000 | 57 | 47 | 37 |
| | 2 | 30–230 | 40 | 30 | — |
| | | 230–1000 | 47 | 37 | — |
| FCC | A | 30–88 | — | — | 29.5 |
| | | 88–215 | — | — | 34.0 |
| | | 215–1000 | — | — | 36.9 |
| | B | 30–88 | 40 | — | — |
| | | 88–216 | 43.5 | — | — |
| | | 216–1000 | 46 | — | — |
| VDE | A | 30–41 | — | — | 54 |
| | | 41–68 | — | — | 30 |
| | | 68–174 | — | — | 54 |
| | | 174–230 | — | — | 30 |
| | | 230–470 | — | — | 54 |
| | | 470–760 | — | 45 | — |
| | | 760–1000 | — | 50–57 | — |
| | B | 30–470 | — | 34 | — |
| | | 470–1000 | — | 40 | — |

-continued

| | CLASS | FREQUENCY (MHz) | dB at 3 m | 10 m | 30 m |
|---|---|---|---|---|---|
| CISPR | A | 30–230 | — | — | 30 |
| | | 230–1000 | — | — | 37 |
| | B | 30–230 | — | 30 | — |
| | | 230–1000 | — | 37 | — |

Figure 11:
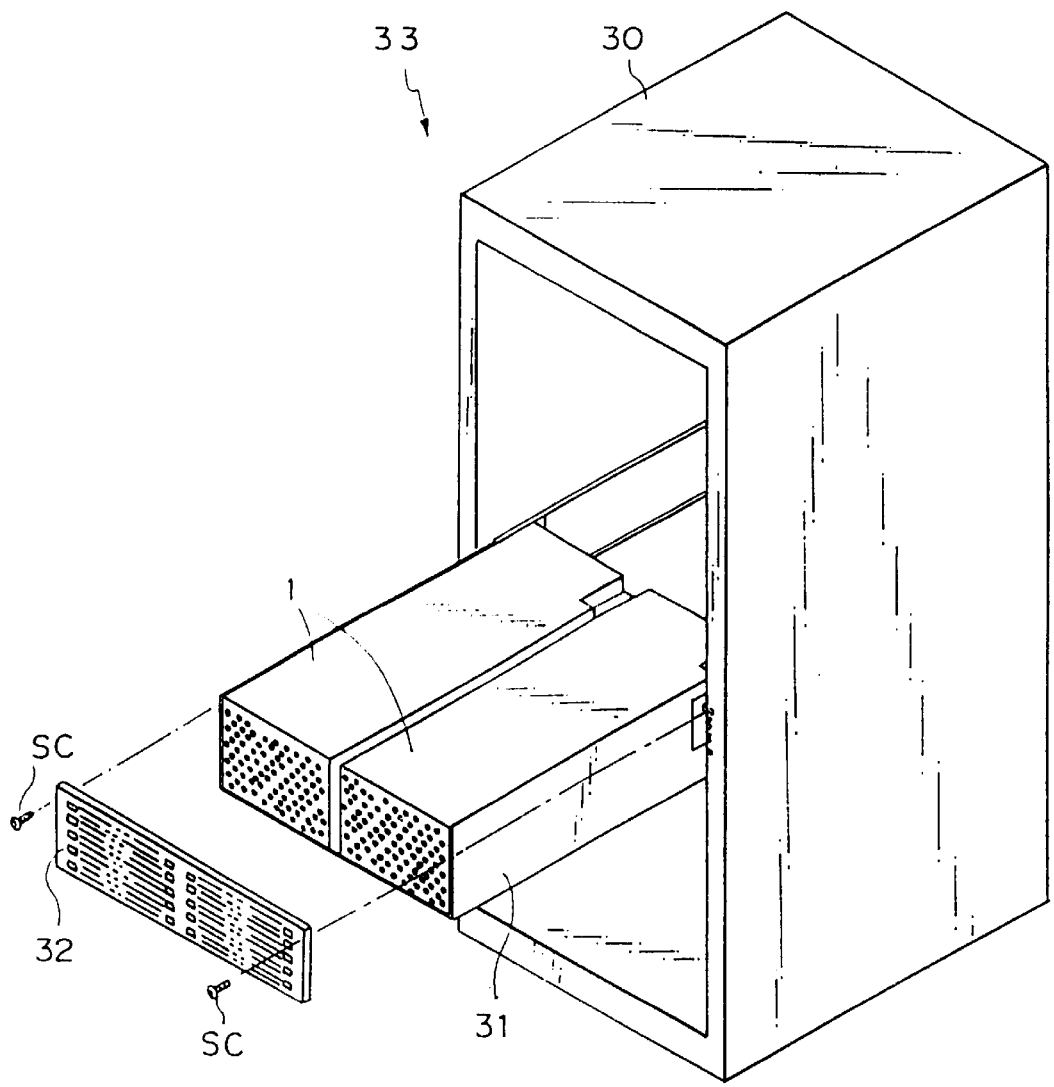
FIG. 11 is a perspective view of a rack having the memory storage disk module of FIG. 1 mounted thereon.

FIG. 11 shows a rack or cabinet 30 of a memory storage disk system 33, using the memory storage disk module 1. The rack 30 has a plurality of outer trays 31 (only one is illustrated in FIG. 11). The outer tray 31 is arranged in the rack 30 as a drawer, and can accommodate two memory storage disk modules 1 therein. A front panel 32 having openings is fixed to the outer tray 31 by screws SC. Since the memory storage disk modules 1 are provided with a shield against an emission of electromagnetic waves, it is possible to design the rack 30 in such a manner that it is not affected by electromagnetic waves. Also, since the power supply unit 2 and the connector unit 9 are provided in each of the memory storage disk modules 1, the rack 30 can be designed in a simple form and the assembly thereof is facilitated.

As explained above, a memory storage disk module according to the present invention has a good cooling capacity and is provided with a shield against an emission of electromagnetic waves, to thereby sufficiently reduce noise emitted externally from an electric or electronic device to which the memory storage disk module is to be mounted.

The present invention has been described with reference to a preferred embodiment, but it should be understood that the present invention is not limited to the illustrated embodiment and modifications thereto can be made within the scope of the present invention. For example, the magnetic disks can be replaced with optical disks, and cooling fans can be optionally provided.

We claim:

1. A memory storage disk module comprising:
   a memory storage disk unit including at least one memory storage disk, and at least one head able to access the disk for writing and reading data to and from the disk;
   a control circuit board attached to the memory storage disk unit and including a control circuit for controlling the disk and the head;
   cover means covering at least the memory storage disk unit and the control circuit board;
   a tray for fixedly carrying the memory storage disk unit and the control circuit board, the cover means being attached to the tray;
   at least one cooling fan arranged within the cover means for supplying a flow of air through the cover means, and
   a top cover which forms a passage of cooling air and directs air flow through a gap between the control circuit board and the memory storage disk unit and is guided by the top cover into the cooling fan.

2. A memory storage disk module according to claim 1, wherein the memory storage disk unit has a housing accommodating the disk and the head, and the control circuit board is attached to the memory storage disk unit on the exterior of the housing thereof, a protective cover being provided to cover the control circuit board, the protective cover being covered by the cover means.

3. A memory storage disk module according to claim 1, wherein the cooling fan is attached to the memory storage disk unit.

4. A memory storage disk module according to claim 1, wherein the memory storage disk unit is mounted on the tray, and the control circuit board is arranged on the opposite side of the memory storage disk unit from the tray.

5. A memory storage disk module according to claim 1, wherein the cover means is made from stainless steel.

6. A memory storage disk module according to claim 5, wherein connector means is provided on the tray for electrically connecting the memory storage disk unit and control circuit board to an external unit.

7. A memory storage disk module comprising:
   a memory storage disk unit including at least one memory storage disk, and at least one head able to access the disk for writing and reading data to and from the disk;
   a control circuit board attached to the memory storage disk unit and including control circuit for controlling the disk and the head;
   a power supply unit electrically connected to at least one of the memory storage disk unit and the control circuit board;
   a first cover covering at least said memory storage disk unit and said control circuit board and having means for shielding electromagnetic waves emitted from at least said control circuit board, said first cover having a longitudinal axis, a main panel portion extending generally along and around the longitudinal axis and having opposite ends, a front panel portion located on the main panel portion at one end thereof, and a rear panel portion located on the main panel portion at the other end thereof, the main panel portion being substantially solid and the front and rear panel portions having small apertures, respectively, allowing air to flow therethrough while shielding electromagnetic waves emitted from at least said control circuit board; and
   first and second cooling fans arranged within the first cover for supplying a flow of air through the first cover, the first cooling fan being attached to the memory storage disk unit and the second cooling fan being attached to the power supply unit, wherein the first cooling fan includes a second cover to form a passage of cooling air so that air flows through a gap between the control circuit board and the memory storage disk unit and is guided by the second cover into the first cooling fan.

8. A memory storage disk module according to claim 7, wherein the memory storage disk unit has a housing accommodating the disk and the head, and the control circuit board is attached to the memory storage disk unit on the exterior of the housing thereof, a protective cover being provided to cover the control circuit board, the protective cover being covered by the first cover.

9. A memory storage disk module according to claim 7, wherein the power supply unit includes a frame, and the second cooling fan is attached in the frame of the power supply unit.

10. A memory storage disk module according to claim 9, wherein the frame of the power supply unit is constructed such that air flows through the frame of the power supply unit.

11. A memory storage disk module according to claim 7, wherein the first cooling fan is arranged between the memory storage disk unit and the power supply unit.

12. A memory storage disk module according to claim 7, wherein the rear panel portion is integrally formed with the main panel portion.

13. A memory storage disk module according to claim 7, wherein the memory storage disk unit is mounted on a tray inside the first cover, and the control circuit board is arranged on the side of the memory storage disk unit apart from the tray.

14. A memory storage disk module according to claim 7, wherein the first cover is made from stainless steel.

15. A memory storage disk module comprising:

a memory storage disk unit including at least one memory storage disk, and at least one head able to access the disk for writing and reading data to and from the disk;

a control circuit board attached to the memory storage disk unit and including a control circuit for controlling the disk and the head;

a power supply unit electrically connectable to at least one of the memory storage disk unit and the control circuit board;

cover means covering at least the memory storage disk unit, the control circuit board, and the power supply unit;

a tray for fixedly carrying the memory storage disk unit, the control circuit board and the power supply unit, the cover means being attached to the tray; and at least one cooling fan arranged within the cover means for supplying a flow of air through the cover means, said cooling fan being arranged between the memory storage disk unit and the power supply unit, so that a flow of air is induced from one end of the memory storage disk unit to the other end thereof, and the memory disk storage unit, the control circuit board and the power supply unit are all cooled by said cooling fan.

16. A memory storage disk module according to claim 15, wherein the memory storage disk unit has a housing accommodating the disk and the head, and the control circuit board is attached to the memory storage disk unit on the exterior of the housing thereof, a protective cover being provided to cover the control circuit board, the protective cover being covered by the cover means.

17. A memory storage disk module according to claim 15, wherein the cooling fan is attached to the memory storage disk unit and includes a second cover to form a passage of cooling air so that air flows through a gap between the control circuit board and the memory storage disk unit and is guided by the second cover into the first cooling fan.

18. A memory storage disk module according to claim 15, wherein the power supply unit includes a frame, and a second cooling fan is attached in the frame of the power supply unit.

19. A memory storage disk module according to claim 18, wherein the frame of the power supply unit is constructed such that air flows through the frame of the power supply unit.

20. A memory storage disk module according to claim 15, wherein the memory storage disk unit is mounted on the tray, and the control circuit board is arranged on the opposite side of the memory storage disk unit from the tray.

21. A memory storage disk module according to claim 15, wherein the cover means is made from stainless steel.

22. A memory storage disk module according to claim 15, wherein connector means is provided on the tray for electrically connecting the memory storage disk unit and the control circuit board to an external unit.

* * * * *

UNITED STATES PATENT AND TRADEMARK OFFICE
CERTIFICATE OF CORRECTION

PATENT NO. : 5,999,365
DATED : December 7, 1999
INVENTOR(S) : Hasegawa et al.

It is certified that error appears in the above-identified patent and that said Letters Patent is hereby corrected as shown below:

Claims:
In claim 6, line 1, please delete "claim 5" and insert --claim 1 --therefor Signed and Sealed this Third Day of July, 2001

*Attest:*

NICHOLAS P. GODICI
*Attesting Officer*    *Acting Director of the United States Patent and Trademark Office*